Sept. 20, 1960 C. C. JORDAN 2,952,935
BAIT
Filed Jan. 13, 1958
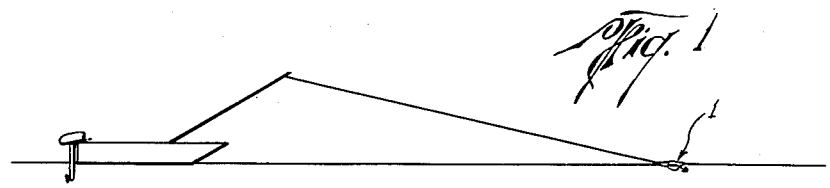
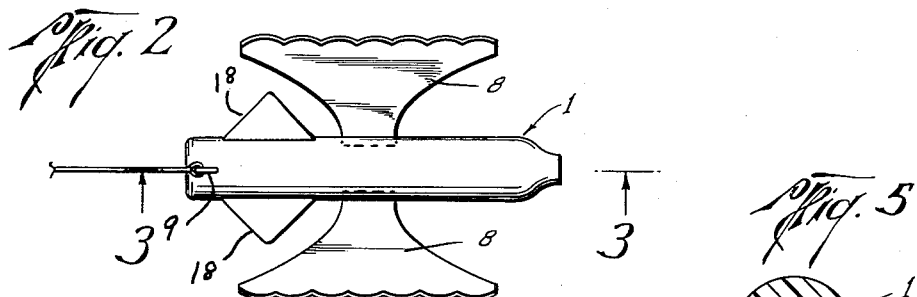
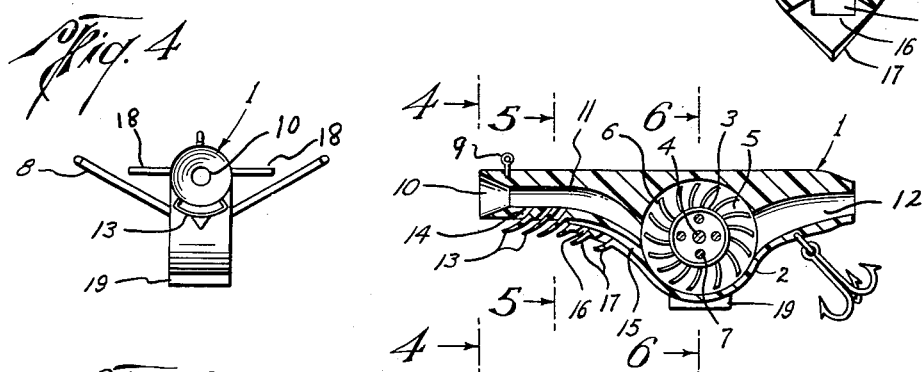
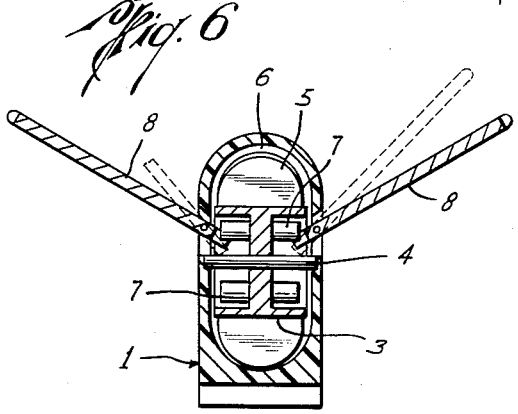
Clarence C. Jordan
INVENTOR.
BY Ransler O. Wyatt
ATTORNEY

United States Patent Office 2,952,935
Patented Sept. 20, 1960

2,952,935
BAIT

Clarence C. Jordan, Houston, Tex.
(Box 124, Splendora, Tex.)

Filed Jan. 13, 1958, Ser. No. 708,684

1 Claim. (Cl. 43—26.2)

This invention relates to new and useful improvements in a bait.

It is an object of this invention to provide a bait having novel means for effecting movement and action in the water to attract fish.

It is another object of the invention to provide a novel article of manufacture.

It is still a further object of the invention to provide an artificial bait having means for directing a stream of water through the bait and actuating a water wheel to impart motion to extended parts simulating wings.

With the above and other objects in view, the invention has relation to certain novel features of construction, operation and arrangement of parts more particularly defined in the following specification and illustrated in the accompanying drawings, wherein:

Figure 1 is a side view of the bait as used in fishing.

Figure 2 is an enlarged top view.

Figure 3 is a side elevational view in cross section taken on the line 3—3 of Figure 2.

Figure 4 is an end view, taken on the line 4—4 of Figure 3.

Figure 5 is a cross sectional end view taken on the line 5—5 of Figure 3, and

Figure 6 is a cross sectional end elevational view taken on the line 6—6 of Figure 3.

Referring now more particularly to the drawings, the numeral 1 designates a body of the bait which may be formed of any suitable material, preferably one that will float, and which may be formed in two pieces, as by molding, and fastened together in any suitable manner as by glue, or by bolting the parts together. The member 1 has an enlarged portion 2, in which a chamber 6 is formed, and in which the wheel 3 is rotatably mounted by any suitable bearing means, such as the axle 4 seated in depressions in the inside wall of the chamber. Scoops 5 are mounted on the wheel 3 in any desired number, and a recess is formed in each side wall of the wheel 3 in which a plurality of projections 7, 7 are mounted.

A pair of wings, as 8, 8, are pivotally mounted in the side walls of the body 1 and extend therethrough, one end extending into the recesses in the wheel 3. The ends extending into the recesses are urged upwardly by the weight of the greater portion of the wings 8, 8 which extend outwardly beyond the pivot point.

Suitable means, as the eye 9, may be provided adjacent the forward end of the body for the attachment of a fishing line. The forward end face of the body has a cone shaped port 10 leading into a channel 11 which terminates in the wheel chamber 6 and its discharge end is downwardly turned to direct the flow of water therethrough against the scoops 5 to rotate the wheel 3. A channel 12 extends on through the rear portion of the body member 1 from the chamber 6 through which the water flows out of the chamber 6. Extending downwardly from the body 1 and being forwardly curved are the water intake guides 13 which direct a flow of water through the ports 14 into the channel 11. A separate channel 15 extends through the forward end of the body member 1 and leads into the chamber 6, directing a flow of water against the scoops 5 and a plurality of outwardly directed blades 17, extending downwardly from the body member 1, guide a flow of water through the ports 16 into the channel 15.

If desired, suitable planing members as 18, 18 may be formed to extend outwardly from the body member 1 to maintain the body member at the desired position in the water which will normally be at the surface. The plane members 18, 18 may be readily bent to direct the body downwardly into the water if desired, or to adjust the position of the body member during use.

Suitable weights, as 19, may be secured to the lower surface of the body member 1 to give the desired stability.

As the bait is drawn through the water, a flow of water will pass through the channels 11, 15, being directed into the channels through the port 10, the guides 13, and ports 14, and the blades 17 and ports 16, against the scopes 5, rotating the wheel 3, and as the wheel 3 rotates, the inwardly directed ends of the wings 8, 8 will contact the projections 7, 7 and will be depressed, the projections 7, 7 being cylindrical and the inwardly directed ends of the wings 8, 8 passing around and beneath the outside curved surfaces of the projections 7, 7 causing the extended ends of the wings 8, 8 to rise, giving a fluttering action to the wings.

The body may be formed in the shape of an insect, or any other type of natural prey for fish, and the turbulence caused by the water flowing through the discharge end of the channel 15 will add to the fluttering action of the wings to attract fish to the bait.

In manufacture the device will be molded in two pieces, preferably divided longitudinally and vertically, the wheel will be molded separately, and will be placed in the chamber, with the ends of the axle in the depressions in the inside walls thereof, and the parts glued, or otherwise secured together.

While the foregoing is considered a preferred form of the invention, it is by way of illustration only, the broad principle of the invention being defined by the appended claim.

What I claim is:

In a bait, a body member having a wheel chamber, means for directing a flow of water into and out of said chamber, a rotatable wheel transversely mounted in said chamber having outwardly extending scoops, recesses in the side walls of said wheel, wings extending through said body member having one end extending into said recesses, projections in said recesses adapted to contact said wing ends extending into said recesses and raise the outwardly extended ends of said wings.

References Cited in the file of this patent
UNITED STATES PATENTS

| | | |
|---|---|---|
| 1,263,838 | Barber | Apr. 23, 1918 |
| 1,390,601 | Caldwell | Sept. 13, 1921 |
| 2,450,253 | Parnell | Sept. 28, 1948 |
| 2,534,639 | Twist | Dec. 19, 1950 |
| 2,688,205 | Brown | Sept. 7, 1954 |
| 2,808,677 | Dusablon et al. | Oct. 8, 1957 |
| 2,825,994 | Bruhn | Mar. 1, 1958 |